United States Patent
Artelsmair et al.

(10) Patent No.: US 12,145,225 B2
(45) Date of Patent: Nov. 19, 2024

(54) METHOD AND WELDING DEVICE WITH DETECTION OF ELECTRICAL CONTACTS DURING A WELDING PROCESS

(71) Applicant: Fronius International GmbH, Pettenbach (AT)

(72) Inventors: Josef Artelsmair, Pettenbach (AT); Dominik Söllinger, Pettenbach (AT); Andreas Waldhör, Pettenbach (AT); Manuel Binder, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 20 days.

(21) Appl. No.: 18/031,465

(22) PCT Filed: Dec. 1, 2021

(86) PCT No.: PCT/EP2021/083690
§ 371 (c)(1),
(2) Date: Apr. 12, 2023

(87) PCT Pub. No.: WO2022/117608
PCT Pub. Date: Jun. 9, 2022

(65) Prior Publication Data
US 2023/0390851 A1 Dec. 7, 2023

(30) Foreign Application Priority Data
Dec. 2, 2020 (EP) .................................... 20211334

(51) Int. Cl.
*B23K 9/095* (2006.01)
*B23K 9/10* (2006.01)
B23K 37/02 (2006.01)

(52) U.S. Cl.
CPC ............ *B23K 9/10* (2013.01); *B23K 37/0229* (2013.01)

(58) Field of Classification Search
CPC ....... B23K 9/0953; B23K 9/126; B23K 9/095
See application file for complete search history.

(56) References Cited

U.S. PATENT DOCUMENTS

| 4,324,971 A | * | 4/1982 | Frappier | B23K 9/0735 |
| | | | | 219/121.36 |
| 4,493,969 A | * | 1/1985 | Legrand | B23K 9/0678 |
| | | | | 219/136 |

(Continued)

FOREIGN PATENT DOCUMENTS

| CN | 1894070 A | 1/2007 |
| CN | 106573325 A | 4/2017 |

(Continued)

OTHER PUBLICATIONS

Chinese Office Action 2021180077595.9 issued Sep. 2, 2023 with English translation.

(Continued)

*Primary Examiner* — Dana Ross
*Assistant Examiner* — Lawrence H Samuels
(74) *Attorney, Agent, or Firm* — Collard & Roe, P.C.

(57) ABSTRACT

In a method in which a welding process is carried out on a workpiece with a welding torch and to a welding device for carrying out the method, a welding current source is supplied in order to provide a welding voltage, and an electrical voltage is applied, at least temporarily, during the welding process to an external element of the welding torch, in particular to an outer wall of a gas nozzle, and a possibly occurring electrical contact between the external element and a further element, in particular the workpiece or a contact tube, is detected by the electrical voltage applied. The welding current source is electrically connected via at least one first resistor to the external element of the welding torch and the external element of the welding torch is (Continued)

Figure 1:
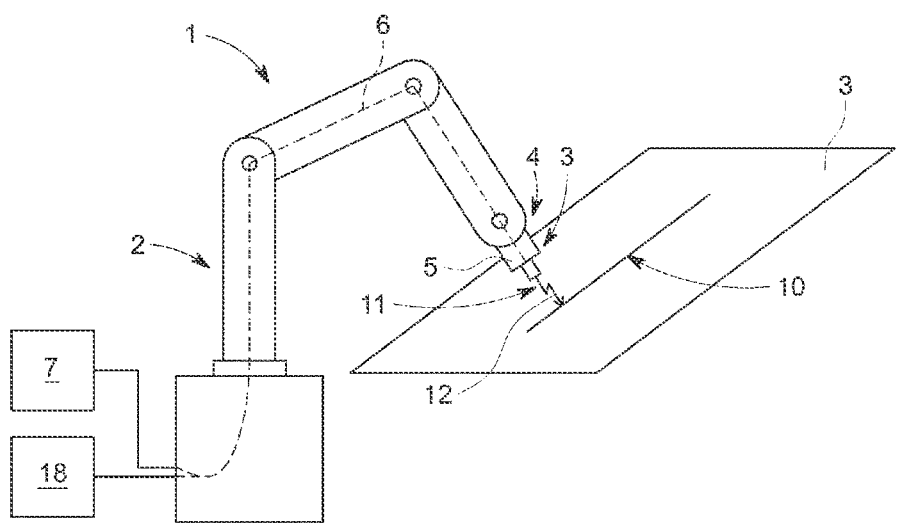

connected to the electrical potential of the workpiece via at least one second resistor.

14 Claims, 10 Drawing Sheets

(56) References Cited

U.S. PATENT DOCUMENTS

| | | | | |
|---|---|---|---|---|
| 5,183,990 | A * | 2/1993 | Enyedy | H05H 1/36 |
| | | | | 219/121.54 |
| 6,334,977 | B1 * | 1/2002 | Matsui | C23C 4/073 |
| | | | | 420/34 |
| 8,461,476 | B2 * | 6/2013 | Wilhelm | B23K 10/02 |
| | | | | 219/121.45 |
| 9,808,882 | B2 | 11/2017 | Hutchison | |
| 9,833,857 | B2 * | 12/2017 | Artelsmair | B23K 9/0953 |
| 2007/0145028 | A1 | 6/2007 | Artelsmair | |
| 2008/0156781 | A1 | 7/2008 | Artelsmair et al. | |
| 2014/0014638 | A1 * | 1/2014 | Artelsmair | B23K 9/126 |
| | | | | 219/130.01 |
| 2015/0060423 | A1 * | 3/2015 | Tanaka | B23K 9/0671 |
| | | | | 219/130.01 |
| 2019/0151978 | A1 * | 5/2019 | Ishikawa | B23K 9/28 |
| 2019/0270157 | A1 | 9/2019 | Kishikawa et al. | |
| 2023/0058191 | A1 | 2/2023 | Rose et al. | |

FOREIGN PATENT DOCUMENTS

| | | |
|---|---|---|
| CN | 115052704 A | 9/2022 |
| JP | H08108277 A | 4/1996 |
| JP | 2013198929 A | 10/2013 |

OTHER PUBLICATIONS

International Search Report in PCT/EP2021/086390, mailed Apr. 7, 2022.

European Search Report in EP 20211334.6, dated Jun. 1, 2021 with translation of relevant parts.

* cited by examiner

METHOD AND WELDING DEVICE WITH DETECTION OF ELECTRICAL CONTACTS DURING A WELDING PROCESS

CROSS REFERENCE TO RELATED APPLICATIONS

This application is the National Stage of PCT/EP2021/083690 filed on Dec. 1, 2021, which claims priority under 35 U.S.C. § 119 of European Application No. 20211334.6 filed on Dec. 2, 2020, the disclosure of which is incorporated by reference. The international application under PCT article 21 (2) was not published in English.

The invention relates to a method in which a welding process is carried out on a workpiece with a welding torch, which is preferably arranged on a robot, wherein a welding current source is supplied in order to provide a welding voltage, and an electrical voltage is applied, at least temporarily, during the welding process to an external element of the welding torch, in particular to an outer wall of a gas nozzle, and a possibly occurring electrical contact between the external element and a further element, in particular the workpiece or a contact tube, is detected by means of the electrical voltage applied.

Furthermore, the invention relates to a welding device for carrying out such a method.

During the execution of welding processes, undesired physical or electrical contacts between the welding torch and the workpiece to be welded or between parts of the welding torch can occur in the event of a fault. Such contacts can interfere with the welding process and consequently have negative effects on the quality of the weld seam. For this reason, contacts occurring in the event of a fault should be immediately identified during the welding process and appropriate countermeasures should be taken quickly in order to prevent damage to the workpiece or the welding torch and to be able to ensure a high quality welding.

An example of physical contact that may occur during the welding process is an undesired touching of the welding torch with the workpiece. Such a contact can occur, for example, if the welding path has been planned incorrectly in an automated performed welding process or the workpiece has been placed incorrectly. If there is touching between the welding torch and the workpiece, damage to the workpiece or the welding torch may be caused. In order to avoid serious damage, so-called collision boxes are used in robot-assisted welding processes, which interrupt a welding process or bring a robot to a standstill as soon as a force acting on the welding torch, which force arises when the welding torch touches the workpiece, exceeds a certain threshold value. A collision box is known, for example, from US 2018/0029238 A1. However, stopping the welding process causes delays in the production process. In addition, if the welding process is interrupted, the weld seam is not welded continuously, which can reduce the quality of the weld seam. Moreover, damage to the workpiece or the welding torch or the weld seam can already be caused in the time between the first contact and the reaching of the necessary threshold value for triggering the collision box.

An example of an undesired electrical contact which may occur during the welding process at the welding torch is the formation of electrical connections between different, partly voltage-carrying parts of the welding torch by metallic spatter of a melting welding wire. For example, it may occur that a part of the welding torch, for example a gas nozzle, which under normal circumstances is not voltage-carrying, is electrically connected to the welding voltage potential of the welding current source by welding spatter, as a result of which the arc can be deflected from its intended position or the welding torch can be damaged.

In summary, unplanned physical and electrical contacts occurring during the welding process are faults that can have adverse effects on the welding process, the workpiece and the welding torch. It is therefore desirable to be able to immediately identify and eliminate such faults at the time of their occurrence.

It is known from the state of the art to detect the position of a workpiece by touching the welding wire (so-called "wire sensing") or by means of laser sensors before the start of a welding process. This is shown, for example, in US 2019/0270157 A1.

US 2014/0014638 A1, JP H08 108277 A and JP 2013 198929 A disclose welding devices and methods in which a collision of a welding torch with a workpiece can be detected.

In the light of these embodiments, it is the object of the present invention to alleviate or even completely eliminate the drawbacks of the state of the art. In particular, it is the object of the present invention to provide a method and a welding device of the type mentioned at the beginning, which make it possible to detect undesired or unplanned contacts occurring between parts of the welding torch or the welding torch and the workpiece as quickly as possible during a welding process, in order to achieve a continuous welding process and an optimal welding quality.

This object is achieved by a method according to claim 1 and by a welding device according to claim 8.

According to the invention, in a method of the above-mentioned type, it is provided that the welding current source is electrically connected via at least one first resistor to the external element of the welding torch and the external element of the welding torch is connected to the electrical potential of the workpiece via at least one second resistor. By applying an electrical voltage to the external element of the welding torch during the welding process, contacts occurring between the external element and a further element due to changes in the applied electrical voltage and/or a set electric current can advantageously already be detected at the time of occurrence. Subsequently, as will be described in more detail below, appropriate countermeasures can be taken quickly. Damage to the welding torch or to the workpiece during the welding process can thus advantageously be avoided. Exceeding a threshold value of a force building up when the workpiece is touched by the welding torch, as is necessary in the case of a collision box, is no longer necessary in the method according to the invention. It is advantageous that possibly occurring contacts can be detected during the welding process. In other words, contacts occurring during the production of the weld seam on the workpiece can be detected quickly or in real time. By applying the electrical voltage to the external element of the welding torch, a detectable electrical contact is also produced in the event of physical contact between the external element and the further element, for example the workpiece, whereby an electrical current flow is set. A physical contact of the welding torch is thus accompanied by an electrical contact by application of the voltage and can therefore be detected with the method according to the invention. Expediently, for the detection of a contact occurring, the electrical voltage applied to the external element, an electrical magnitude representative thereof and/or a set electrical current in the case of an electrical contact can be measured and evaluated with the aid of a voltage and/or current measuring device. The electrical contacts that occur and are to be detected between the external element and the further element may be, for example, electrical contacts between the external element and a preferably grounded workpiece that arise through touches or electrical contacts between the external element and another component of the welding torch, for example a contact tube, that arise through welding spatter. The further element can be, for example, a workpiece or a part of the welding torch, such as, for example, a contact tube. The further element can be connected to a pole of the welding device, for example the mass, in particular if it is a workpiece. The applied electrical voltage can, but does not have to, be applied to the external element over the entire duration of the welding process. The potential difference between the electrical earth or ground and the voltage applied to the external element is preferably in a range between 5 V and 350 V, in particular between 15 V and 300 V. The electrical voltage applied may be a welding voltage of a welding current source or a voltage proportional thereto, in particular a down-converted welding voltage. The welding voltage can be down-converted, for example, by means of a voltage divider. The welding voltage can be applied directly or indirectly, preferably via resistor elements or capacitors, to the external element. After detection of an electrical contact between the external element and the further element, appropriate countermeasures can be taken to eliminate the contact, such as cleaning the welding torch from welding spatter, realigning the welding torch or realigning the workpiece. As a result of the early identification of electrical and physical contacts of the type mentioned at the beginning, which is possible with the method according to the invention, countermeasures can still be carried out during the welding process. For example, in a robot-assisted welding method, a path correction can still be carried out during the welding process after detection of an electrical contact between the external element and a workpiece. Preferably, the external element to which the electrical voltage is applied is a gas nozzle of the welding torch or an outer wall of the gas nozzle. However, it would also be conceivable for the external element to be formed by a ring, a wire or a similar element. The gas nozzle of the welding torch preferably surrounds a current-carrying and voltage-carrying contact tube and can form the outermost part of the welding torch. Within the gas nozzle, during the welding process, an inert gas, for example argon or helium, flows, which emerges at a lower end of the gas nozzle through an opening into the environment and protects the arc and the weld seam produced from the oxygen of the ambient air. The welding wire is preferably also guided inside the gas nozzle to the welding point. The contact tube is configured to supply the welding wire with the desired welding current. In the case of a robot-assisted welding method, a mechanical collision box can also be additionally provided. However, when the method according to the invention is used and countermeasures are applied when electrical contacts are detected, this is no longer triggered or only triggered in exceptional cases, since with the method according to the invention, touches of the welding torch with a workpiece can be identified more quickly. In particular, in the method according to the invention, as described above, it is not necessary for a force lying above a certain threshold value to act on the welding torch in order to interrupt the welding process with the aid of the collision box.

In a further development of the invention, it is provided that in the case of a detected electrical contact, in particular touching of the external element with the workpiece, a warning signal is emitted, the welding process is interrupted, a welding path is preferably corrected without interruption of the welding process and/or the workpiece is repositioned. For example, in the case of a detected electrical contact between the external element and the contact tube because of welding spatter, the welding process can be interrupted and a warning signal can be output. If, on the other hand, an electrical contact between the external element and the workpiece is detected, it can in turn be provided that a path correction is carried out during the welding process without interrupting the welding process, so that the gas nozzle no longer touches the workpiece as a result.

In order to apply an electrical voltage to the external element of the welding torch, it is provided that the external element of the welding torch is electrically connected to a welding current source for providing a welding voltage. The external element can be connected directly or indirectly to the welding current source, for example via an ohmic resistance element or a capacitor. In the normal state, that is to say without contact occurring, the potential difference between the grounding and the external element is preferably between 5 V and 350 V, in particular between 15 V and 300 V. The welding voltage can change dynamically during the welding process. It may also be provided that the voltage at the external element is provided by an auxiliary voltage source instead of the welding current source. This can be advantageous in order to detect electrical contacts before or after the welding process without the aid of the welding voltage.

According to the invention, the welding current source is electrically connected to the external element of the welding torch via at least one first resistor. The first resistor can be designed as an ohmic resistor element. It is preferred if the at least one first resistor has a value of at least 10 kΩ. Preferably, a plurality of series-connected first resistors are arranged between the welding current source and the external element. The resistance values of the individual resistors may then be smaller. The series resistance of the first resistors is again preferably at least 10 kΩ. However, a plurality of parallel-connected first resistors can also be arranged between the welding current source and the external element. The resistance values of the individual resistors can then be higher. The parallel resistance of the first resistors is again preferably at least 10 kΩ. The at least one first resistor limits the set electrical current in the event of an electrical contact occurring. In addition, for the detection of an electrical contact occurring, the voltage at the at least one first resistor or the current through the at least one first resistor can be measured. If a plurality of first resistors are provided, the voltage can be measured at all first resistors, at a plurality of first resistors, or at only one first resistor.

According to one embodiment, a capacitor may be provided in parallel with the at least one first resistor. According to the invention, it is further provided that the external element of the welding torch is connected via at least one second resistor to the electrical potential of the workpiece, which is preferably grounded. The second resistor can also be designed as an ohmic resistor element. It is preferred if the at least one second resistor has a value of at least 10 kΩ. Preferably, a plurality of series-connected second resistors are arranged between the external element and the workpiece. The resistance values of the individual resistors may then be smaller. The series resistance of the second resistors is again preferably at least 10 kΩ. However, a plurality of parallel-connected second resistors can also be arranged between the external element and the workpiece. The resistance values of the individual resistors can then be higher. The parallel resistance of the second resistors is again preferably at least 10 kΩ. For the detection of an electrical contact occurring, the voltage at the at least one second resistor or the current through the at least one second resistor can be measured. If a plurality of second resistors are provided, the voltage can be measured at all second resistors, at a plurality of second resistors, or at only one second resistor. According to one embodiment, a capacitor may be provided in parallel with the at least one second resistor. If both at least one first resistor and at least one second resistor are provided, an electrical voltage divider is present between the potential of the workpiece and the potential of the welding current source. An upper branch of the voltage divider is formed by the at least one first resistor and a lower branch of the voltage divider is formed by the at least one second resistor. The external element of the welding torch is electrically connected to a tapping point between the upper and lower branch of the voltage divider. Through voltage and/or current measurements at the voltage divider, for example in the upper and/or lower branch, voltage changes ("voltage shifts") or current flow changes in the voltage divider can be detected, so that a plurality of types of electrical contacts can be easily detected and distinguished from one another. In other words, in this embodiment, a possibly occurring contact is detected on the basis of changes in an electrical magnitude in the voltage divider. Based on the changes in the electrical magnitude, it is also possible to infer the type of contact. In a voltage measurement, it is not necessary to measure the voltage of an entire branch of the voltage divider, but only a partial voltage of a branch can be measured. For example, it may be provided to measure only the voltage across a first or a second resistor. The variant with the voltage divider consisting of resistors has the advantage that electrical contacts between the contact tube and the external element, in particular the gas nozzle, as well as the contact tube and the workpiece, can also be reliably identified.

In a preferred embodiment, it is provided that a possibly occurring electrical contact of the external element with the further element is detected on the basis of a change of a measured voltage, which drops across the at least one first and/or the at least one second resistor, and/or of a measured current which flows through the at least one first and/or at least one second resistor. For example, if the external element touches the workpiece and therefore an electrical contact occurs between the workpiece and the external element, the at least one second resistor is short-circuited so that substantially the entire voltage provided by the welding current source or the auxiliary voltage source drops across the at least one first resistor. In the event of electrical contact of the contact tube with the external element of the welding torch, the at least one first resistor is short-circuited so that substantially the entire voltage provided by the welding current source or the auxiliary voltage source drops across the at least one second resistor. These changes can be detected with voltage and/or current measurements. Subsequently, the nature of the occurring fault or contact can be inferred.

Preferably, on the basis of the change in the measured voltage and/or the measured current, at least two different types of possible electrical contacts are distinguished, namely at least one electrical contact between the external element and a first further element, in particular the workpiece, and one electrical contact between the external element and a second further element, in particular a contact tube of the welding torch. This can take place, for example, on the basis of the above-described voltage shifts or current flow changes in the voltage divider.

In one embodiment, it is provided that at least one first capacitor is arranged parallel to the at least one first resistor and at least one second capacitor is arranged parallel to the at least one second resistor. In this variant of the invention, a current through the first capacitor and/or a current through the second capacitor can be measured. The current may be, for example, an alternating current or a ripple current. A connection point between the at least one first and the at least one second capacitor can be connected to the tapping point of the voltage divider described in more detail above.

In a further development, it is provided that a possibly occurring electrical contact of the external element with the further element is detected on the basis of a change in a measured current which flows through the at least one first and/or the at least one second capacitor. Also in this case, at least two different types of possible electrical contacts can be distinguished, namely at least one electrical contact between the external element and a first further element, in particular the workpiece, and one electrical contact between the external element and a second further element, in particular a contact tube of the welding torch.

In order to be able to distinguish more easily between several types of electrical contacts, it may be convenient if a change in the welding voltage of the welding current source is used in the detection of a possibly occurring electrical contact. For this purpose, the welding voltage of the welding current source can be measured with the aid of a voltage measuring device.

In one embodiment, it is provided that, on the basis of a change in the welding voltage of the welding current source or the above-described auxiliary voltage of the auxiliary voltage supply, a possibly occurring electrical contact between a contact tube or a welding wire of the welding torch and the workpiece is detected before and/or after the welding process. Such an electrical contact is usually associated with a drop in the welding voltage or the auxiliary voltage. Before or after a welding process, the position of the workpiece can be detected in this way. For this purpose, the level of the welding voltage can be reduced in comparison to the level of the required welding voltage during the welding process. The occurring electrical current can also be limited in the case of an electrical contact.

In order to check or detect the position of the workpiece, the external element of the welding torch can be brought in touch with the workpiece before or after the welding process in order to detect the position of the workpiece. In such case, therefore, the external element is deliberately brought in touch with the workpiece. This can be done, for example, by positioning the welding torch with a robot. As soon as an electrical contact is detected by the applied voltage at the external element, the welding torch can be stopped or moved again in the opposite direction. The position of the touching with the workpiece and thus the position of the workpiece can be determined for example from the position of the robot. Preferably, in this embodiment, the voltage applied to the external element is provided by an auxiliary voltage source.

The above-mentioned object is also achieved by a welding device, in particular an inert gas welding device according to claim 8. The welding device is configured for carrying out a welding process on a workpiece with a welding torch. The welding torch is preferably arranged on a robot, so that the welding process can proceed in an automated manner. The robot can then be seen as part of the welding device. The welding device has a welding current source for providing a welding voltage. Provision is made for an electrical voltage to be applied to an external element of the welding torch, in particular to an outer wall of a gas nozzle, and for a detection unit to be provided and to be configured to detect a possibly occurring electrical contact between the external element and a further element, in particular the workpiece or a contact tube of the welding torch, with the applied voltage during the welding process. The welding device is therefore capable of carrying out the method described above. With regard to further features and the advantages with respect to the welding device, reference is therefore made to the above embodiments on the method according to the invention.

In the welding device, it is provided that for applying the electrical voltage, the welding current source is connected to the external element of the welding torch in order to provide a welding voltage.

In order to limit the current flow occurring during an electrical contact, it is provided according to the invention, as explained in more detail above, that the welding current source is connected to the external element of the welding torch via at least one first resistor. The first resistor can be designed as an ohmic resistor element. It is preferred if the at least one first resistor has a value of at least 10 kΩ. In an embodiment, a plurality of series-connected first resistors can be arranged between the welding current source and the external element. To detect electrical contacts between the external element and a further element, the voltage at the at least one first resistor or the current through the at least one first resistor can be measured with the aid of current and/or voltage measuring sensors. If a plurality of first resistors are provided, the voltage can be measured at all first resistors, at a plurality of first resistors, or at only one first resistor.

Furthermore the invention provides that the external element of the welding torch is connected via at least one second resistor to the potential of the workpiece. The second resistor can also be designed as an ohmic resistor element. It is preferred if the at least one second resistor has a value of at least 10 kΩ. Preferably, a plurality of series-connected second resistors are arranged between the external element and the workpiece. If both at least one first resistor and at least one second resistor are provided, a voltage divider is present between the potential of the workpiece and the potential of the welding current source or the auxiliary voltage source, at whose tapping point the external element of the welding torch is electrically connected. Through voltage and/or current measurements at the voltage divider, voltage changes ("voltage shifts") in the voltage divider can be detected, so that a plurality of types of electrical contacts can be easily identified and distinguished from one another.

In one embodiment, the detection unit is configured to measure a voltage and/or a current at/through the at least one first resistor and/or at least one second resistor.

In a further embodiment, a first capacitor is arranged parallel to the at least one first resistor and a second capacitor is arranged parallel to the at least one second resistor. The detection unit may be configured to measure the current through the at least one first capacitor and/or the current through the at least one second capacitor. A connection point between the at least one first and the at least one second capacitor can be connected to the tapping point of the voltage divider described in more detail above.

The invention will be explained in more detail below with reference to figures, to which, however, it is not intended to be limited.

Figure 2A:
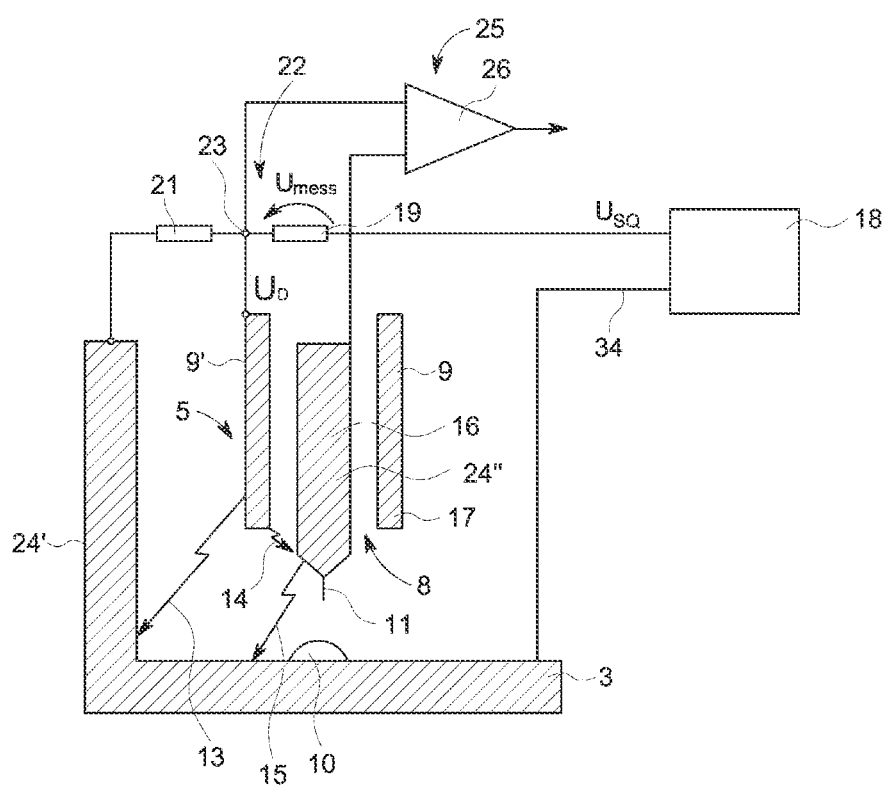
Figure 2B:
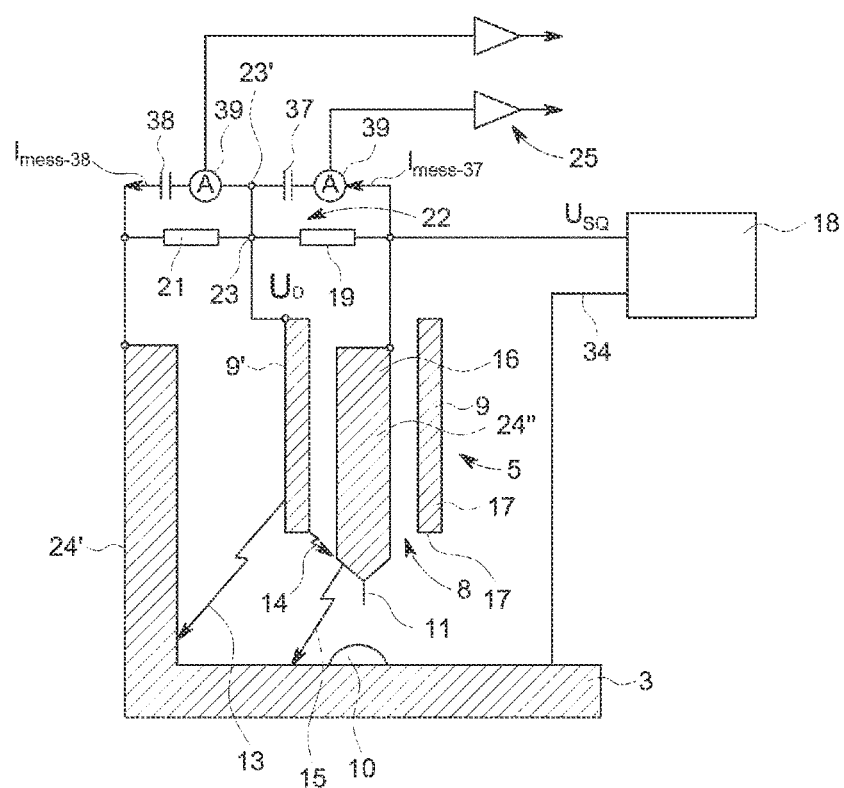
Figure 2C:
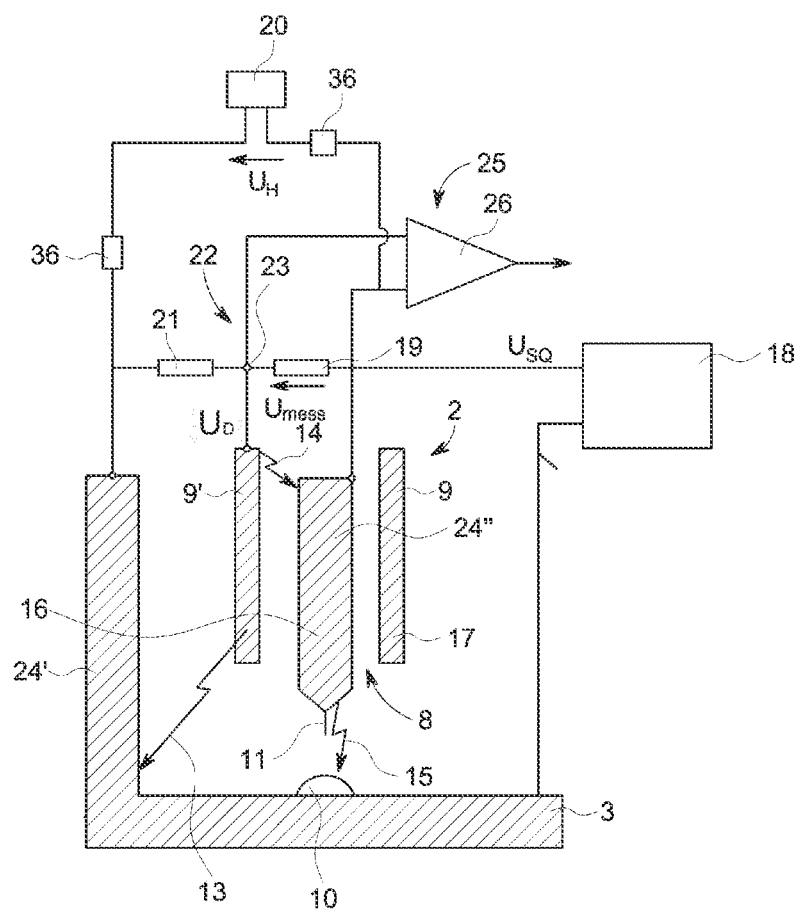
Figure 3A:
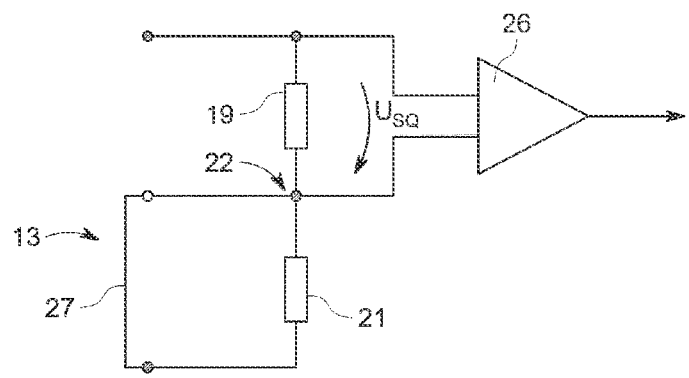
Figure 3B:
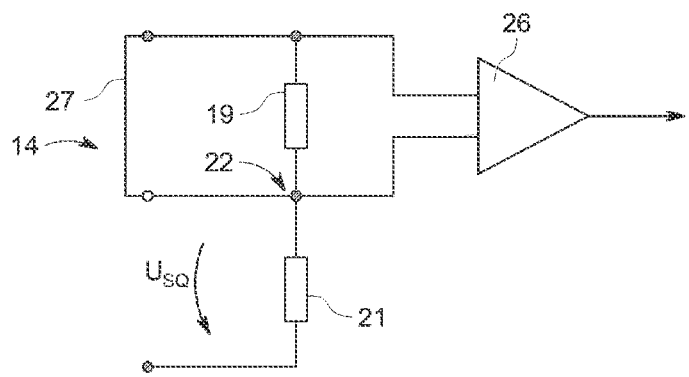
Figure 3C:
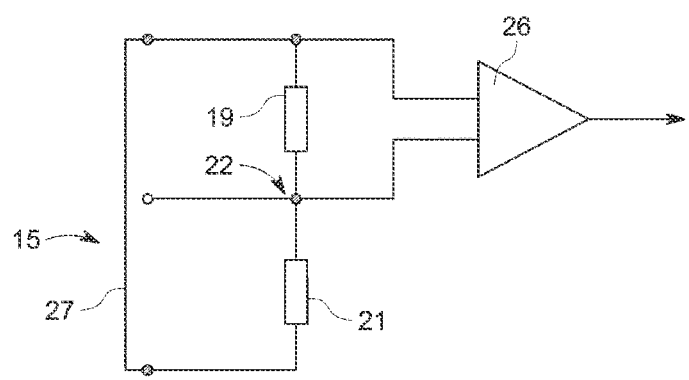
Figure 4:
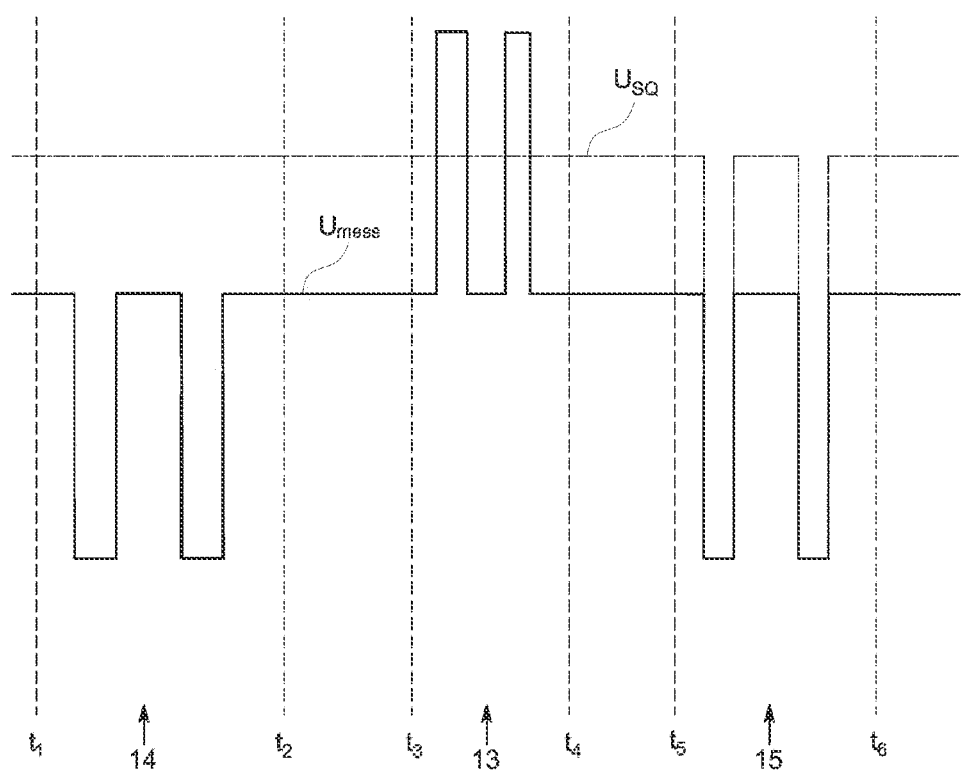
Figure 5A:
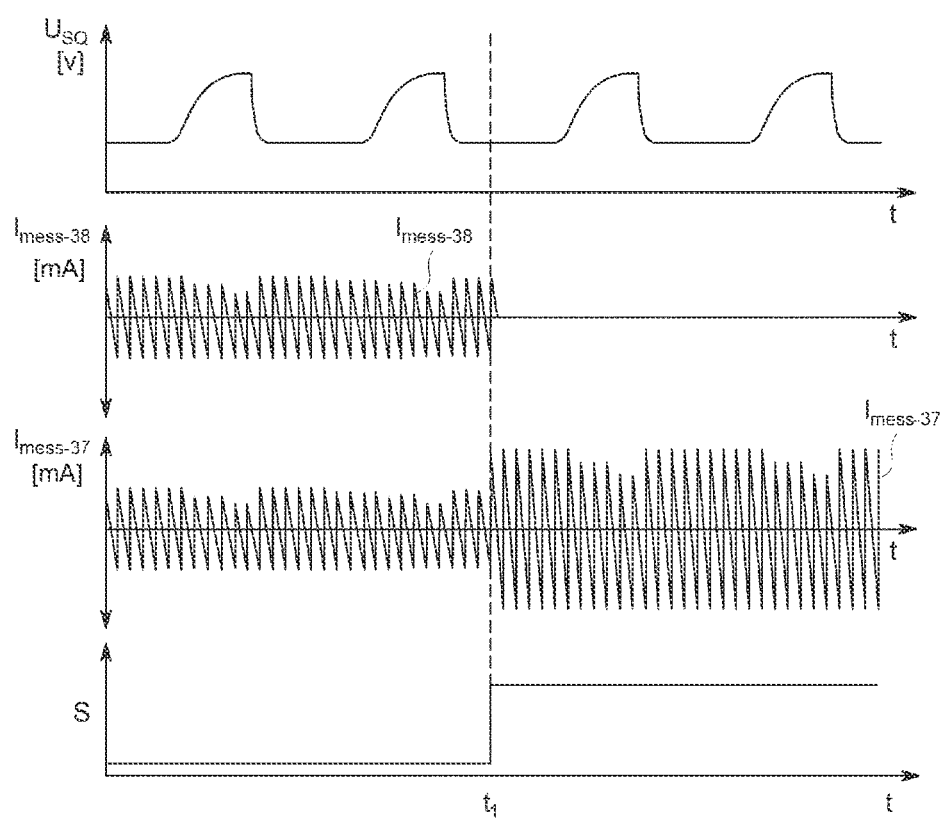
Figure 5B:
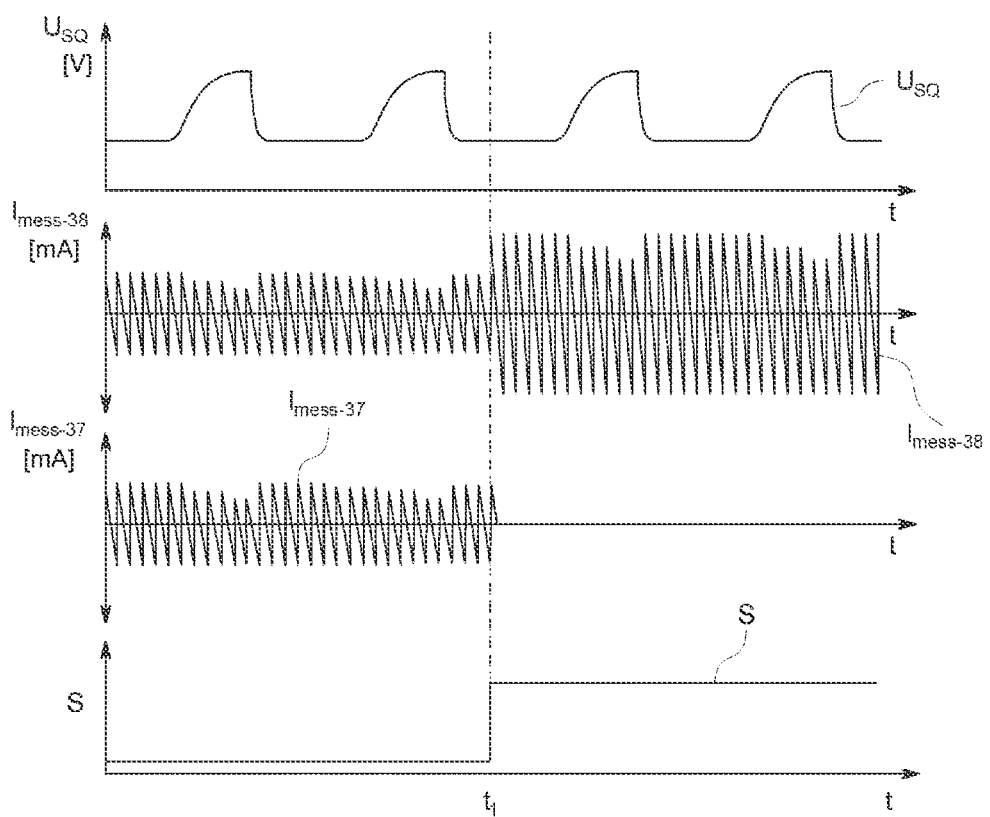
Figure 6:
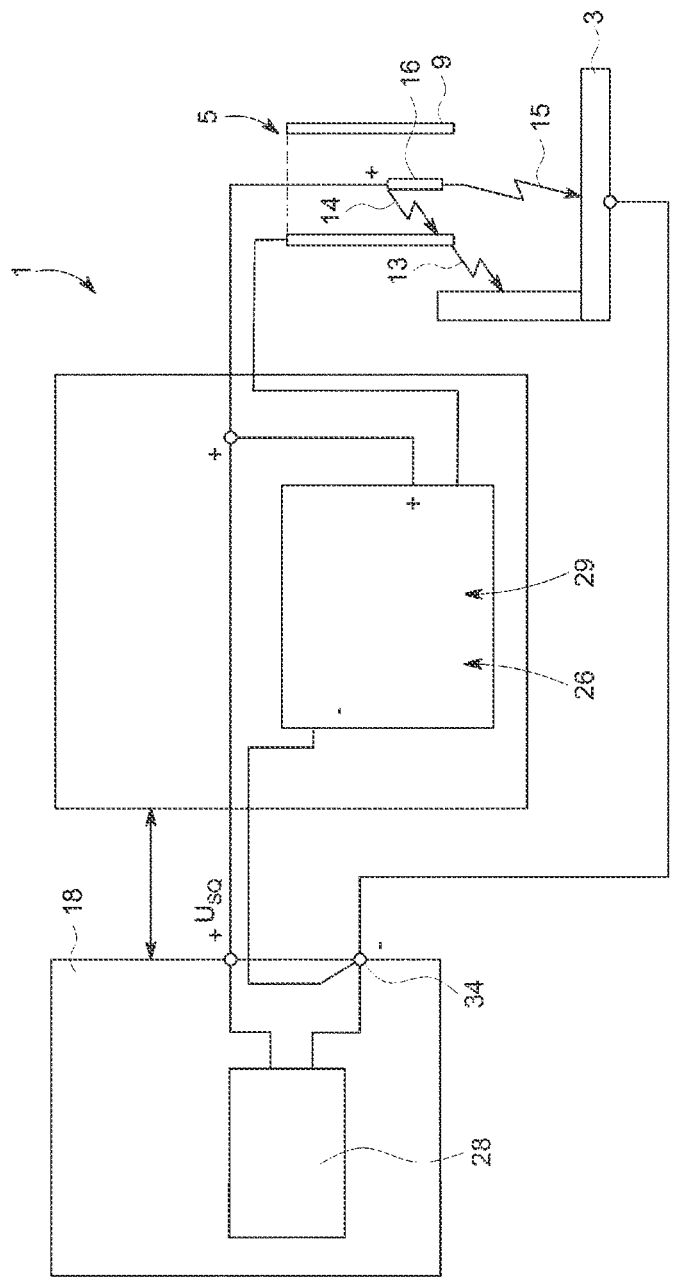

The figures show:

FIG. 1, a schematic representation of a welding device with a welding robot;

FIG. 2A, a schematic cross-sectional representation of a welding torch according to a first embodiment of the invention;

FIG. 2B, a schematic cross-sectional representation of a welding torch according to a second embodiment of the invention;

FIG. 2C, a schematic representation of a welding torch with an auxiliary voltage source;

FIGS. 3A-3C, respectively, a simplified representation for illustrating voltage drops at a voltage divider;

FIG. 4, various schematic signal courses of the welding device according to the invention;

FIGS. 5A and 5B, the course of a welding voltage, the course of currents through capacitors of the welding device, and the course of a detection signal;

FIG. 6, a simplified block diagram; and

Figure 7A:
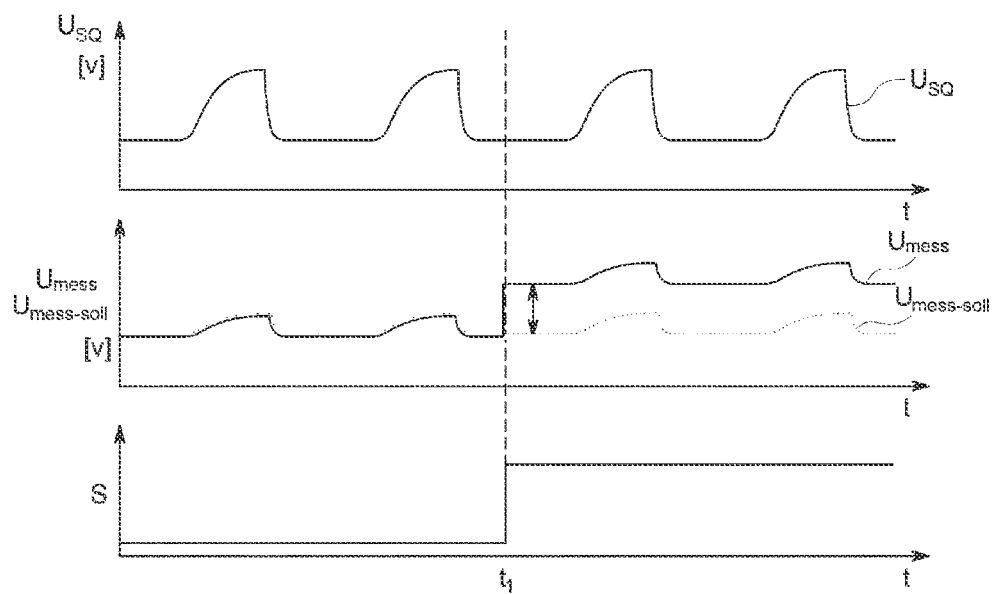
Figure 7B:
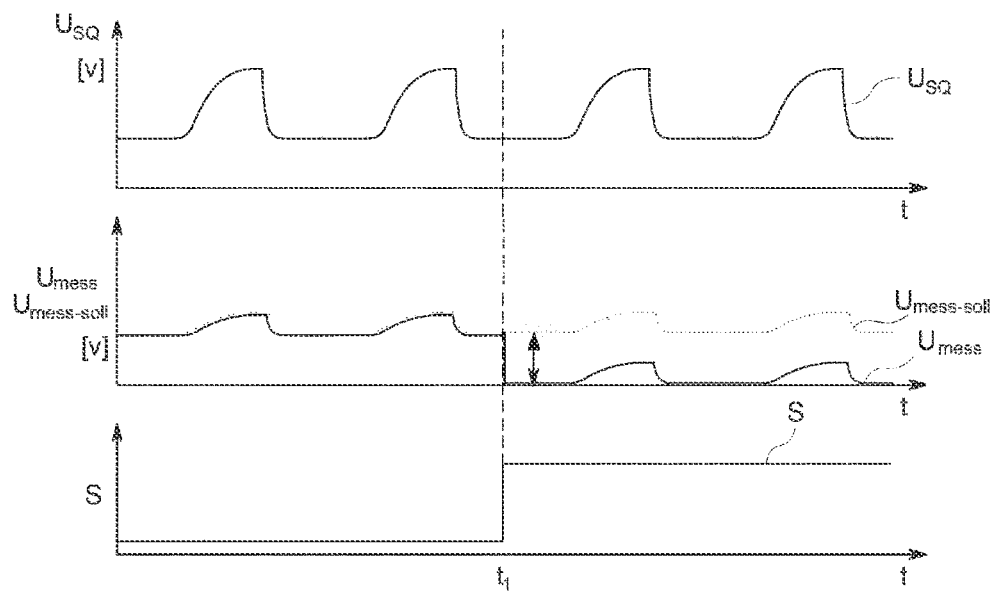

FIGS. 7A and 7B, the course of a welding voltage, the course of a measuring voltage and the course of a detection signal.

FIG. 1 shows a welding device 1 with a welding robot 2 which is designed to carry out an inert gas welding process on a workpiece 3. A welding torch 5 is fastened to a flange 4 of the welding robot 2 and is connected via a hose package 6 to a welding current source 18 and a gas supply 7. The gas supply 7 supplies the welding torch 5 with an inert gas, for example helium, argon, $CO_2$ or mixtures thereof, which emerges at a lower opening 8 of a gas nozzle 9 (see FIG. 2A and FIG. 2B) of the welding torch 5 and protects the arc 12 and the weld seam 10 on the workpiece 3 from the oxygen of the ambient air and chemical reactions. A welding wire 11 (see FIG. 2A and FIG. 2B) is also passed through the gas nozzle 9, for the melting of which an arc 12 is generated between the end of the welding wire 11 and the workpiece 3. The welding robot 2 travels along a predetermined trajectory, while the welding torch 5 carries out the welding process.

During the welding process, an undesirable contact 13 may occur between the welding torch 5 and the workpiece 3, as shown in FIG. 2A and FIG. 2B. It can also happen that metallic spatter (not shown) of the melting welding wire 11 produces an electrical contact 14 between the gas nozzle 9 and a voltage-carrying contact tube 16 arranged inside the gas nozzle 9. The described contacts 13 and 14 can have disadvantageous effects on the welding process, since damage to the welding torch 5 or to the workpiece 3 can occur due to the touching between the welding torch 5 and the workpiece 3, or the arc 12 can be deflected in the event of an electrical short circuit between the contact tube 16 and the gas nozzle 9.

The metallic spatter mentioned may also adversely affect the outlet of the inert gas, so that a deterioration of the gas protection for the weld seam 10 and the arc 12 may occur. If a plurality of contacts 13, 14 occur simultaneously, the individual disadvantages of the contacts 13, 14 can also be reinforced. For example, if a contact 13 and a contact 14 occur simultaneously, an arc can be produced between the gas nozzle 9 and the workpiece 3. Contacts 13, 14 should therefore be identified quickly and appropriate countermeasures should be taken. In addition to the two contacts 13 and 14, a contact 15 can also occur between the contact tube 16 and the workpiece 3, which is monitored during the welding process. The contact 15 can take place deliberately during the welding process, in particular a short-circuited welding process, and thus cannot represent a fault.

According to the invention, to identify the contacts 13 and 14, an electrical voltage $U_D$ is applied to an external element 17 of the welding torch 5, preferably to the gas nozzle 9 of the welding torch 5, in particular to an outer wall 9' of the gas nozzle 9, and possibly occurring contacts 13 and 14 during the welding process are detected with the aid of this applied voltage $U_D$ or on the basis of the change in the voltage $U_D$ or an electrical magnitude related thereto. This is illustrated in FIG. 2A and FIG. 2B using two exemplary embodiments of the invention.

FIG. 2A shows a schematic cross-sectional representation of a welding torch 5. The welding torch 5 has a contact tube 16, which acts on a welding wire 11 with a welding voltage $U_{SQ}$ provided by a welding current source 18. The contact tube 16 is surrounded by the gas nozzle 9. The gas nozzle 9 forms an external element 17 of the welding torch 5 and is electrically connected to the welding current source 18 via at least one first resistor 19, so that a voltage $U_D$ is applied to the gas nozzle 9. The voltage $U_D$ is therefore a part of the voltage $U_{SQ}$. It is also possible to provide a plurality of first resistors 19, which in particular can be connected in series or in parallel. For the purpose of a better overview, however, only a first resistor 19 is shown below.

The gas nozzle 9 is also connected via a second resistor 21 to the potential of the workpiece 3, which is usually connected to the negative pole (ground 34) of the welding device 1. The second resistor 21 is thus connected, on the one hand, to the gas nozzle potential and, on the other hand, to the electrical ground 34. It is also possible to provide a plurality of second resistors 21, which in particular can be connected in series or in parallel. For the sake of clarity, however, only a second resistor 21 is shown below. A voltage divider 22 is formed with the resistors 19, 21, which has a tapping point 23, to which the gas nozzle 9 is electrically connected. The potential of the tapping point 23 is accordingly present at the gas nozzle 9, so that the voltage $U_D$ is present at the gas nozzle 9.

In order to detect possibly occurring electrical contacts 13, 14 of the gas nozzle 9 with further elements 24', 24", for example the workpiece 3 or the contact tube 16, a detection unit 25 is provided. The detection unit 25 is configured to detect a possibly occurring electrical contact 13, 14 by measuring or monitoring a voltage $U_{mess}$ at the at least one first resistor 19 and/or at least one second resistor 21. Alternatively, the detection unit 25 for detecting contacts 13, 14 could also measure a current through the at least one first resistor 19 or the at least one second resistor 21 instead of the voltage. In FIG. 2A, only the voltage $U_{mess}$ at the at least one first resistor 19 is measured. To measure the voltage, the detection unit 25 has at least one voltage measuring device 26. The method for detecting and distinguishing the electrical contacts 13, 14 will be described in more detail below. First, a further embodiment of the invention is described.

FIG. 2B shows an alternative embodiment of the invention. In FIG. 2B, at least one first capacitor 37 is connected in parallel with the at least one first resistor 19. Furthermore, at least one second capacitor 38 is connected in parallel with the at least one second resistor 21. In the embodiment shown, the detection unit 25 has two current measuring devices or current measuring sensors 39, which separately or independently measure the electrical currents through the first capacitor 37 and the second capacitor 38. The branch consisting of the current-measuring sensors 39 and the capacitors 37, 38, one current-measuring sensor 39 and one capacitor 37, 38 each being connected in series, forms a further voltage divider, the tapping point 23' of which is connected to the tapping point 23 of the voltage divider 22. By monitoring the respective currents flowing through the capacitors 38 or their change, possibly electrical contacts 13, 14 can be detected and distinguished from one another, as will be explained in more detail below.

In order to be able to detect and distinguish the electrical contacts 13, 14, in the embodiment according to FIG. 2A the voltage $U_D$ or the voltage at one of the resistors 19, 21 is measured or monitored and compared with a target value. Of course, (only) the current through the first 19 and/or second resistor 21 could also be measured or monitored and compared with a target value. In the embodiment according to FIG. 2B, the currents through the first 37 and the second capacitor 38 are detected and compared with a target value. In the fault-free normal state, in which there is no electrical contact 13, 14, the welding voltage $U_{SQ}$ is divided according to the resistance values of the resistors 19, 21. The voltage $U_D$, which in the embodiment shown is lower than $U_{SQ}$, is applied to the gas nozzle 9. If the resistors 19, 21 have substantially equal resistance values, $U_D$ is substantially 50% of the welding voltage $U_{SQ}$. If an electrical contact 13, 14 occurs, voltage shifts occur within the voltage divider 22. These voltage shifts or the associated change in the electrical current can be detected with the aid of the detection unit 25 and an electrical contact 13, 14 can thereby be inferred during the welding process.

FIG. 2C shows a welding torch with an auxiliary voltage source 20. The auxiliary voltage source 20 can preferably deliver a voltage higher than the welding current source 18. The auxiliary voltage source 20 is preferably isolated, in particular galvanically isolated, from the welding current source 18. The isolation of the welding current source 18 can be made via a decoupling circuit 36. The decoupling circuit 36 can contain at least one electrical switch, in particular a relay, for this purpose. However, an isolation is not mandatory. The auxiliary voltage source 20 is preferably used for detecting the electrical contacts 13, 14, 15 before or after the welding process without the aid of the welding voltage $U_{SQ}$. The contact 15 takes place between the contact tube 16 and the workpiece 3. In FIG. 2C, the welding current source 18 and the auxiliary voltage source 20 are electrically connected to one another via the decoupling circuit 36 in a high-impedance manner (values greater than 10 kΩ). The decoupling circuits 36 also serve as current limitation for the auxiliary voltage source 20.

The effects and the differences between the electrical contacts 13, 14, 15 are explained in more detail below with reference to FIGS. 3A-C. FIGS. 3A-C each show the voltage divider 22 with a voltage measuring device 26 of the detection unit 25. The electrical contacts 13, 14, 15 are each shown with a connection 27.

A first electrical contact 13 can occur by the touching of the gas nozzle 9 with a first further element 24', for example the workpiece 3. As a result of the touching of the gas nozzle 9 with the workpiece 3, the second resistor 21 is short-circuited and the entire welding voltage $U_{SQ}$ drops at the first resistor 19 (FIG. 3A). In relation to the embodiment according to FIG. 2B, this means that no current or only a small current flows through the second capacitor 38 parallel to the second resistor 21 due to the short circuit. By contrast, a current flow can be detected by the first capacitor 37 parallel to the first resistor 19. This case is illustrated in more detail in FIG. 5A. In such a case, the welding path can still be changed during the welding process in order to avoid damage to the workpiece 3 or to the welding torch 5. The welding process does not necessarily have to be interrupted.

A second electrical contact 14 can occur due to metallic welding spatter of a melting welding wire 11 between the gas nozzle 9 and a second further element 24", for example the contact tube 16. Through the electrical contact 14 between the contact tube 16 and the gas nozzle 9, the first resistor 19 is short-circuited and the entire welding voltage $U_{SQ}$ drops at the second resistor 21 (FIG. 3B). In relation to the embodiment according to FIG. 2B, this means that no current or only a small current flows through the first capacitor 37 parallel to the first resistor due to the short circuit. By contrast, a current flow can be detected by the second capacitor 38 parallel to the second resistor 21. This case is illustrated in more detail in FIG. 5B. In the case of a contact of this type, the gas nozzle 9 can be destroyed. In the event of an electrical contact 14, a cleaning recommendation can be issued in order to exchange or clean the welding torch 5, or the welding process can be interrupted.

A third electrical contact 15, the occurrence of which, however, does not constitute a fault during the welding process, is produced by the touching between the contact tube 16 or the welding wire 11 and the workpiece 3. The electrical contact 14 between the contact tube 16 or the welding wire 11 and the workpiece 3 causes the resistors 19 and 21 to be short-circuited. This case, in particular, before or after a welding process by additionally measuring the welding voltage $U_{SQ}$ or an auxiliary voltage Un can be detected and distinguished from the other cases, since in such a case the welding voltage $U_{SQ}$ or the auxiliary voltage $U_H$ also breaks in. In relation to the embodiment according to FIG. 2B, this means that no current flows through the capacitors 37, 38 parallel to the first 19 and to the second resistor 21 due to the short circuit.

FIG. 4 qualitatively shows a course of a measurement voltage $U_{mess}$ (in volts) via the first resistor 19 and a course of a welding voltage $U_{SQ}$, wherein no welding process is carried out for a better overview, which is why the welding voltage $U_{SQ}$ (except for the period between $t_5$ and $t_6$) remains essentially constant. Different electrical contacts 13, 14, 15 occur over time.

In the period between the points in time $t_1$ and $t_2$, two electrical contacts 14 occur between the gas nozzle 9 and the contact tube 16. It can be seen that the welding voltage $U_{SQ}$ remains constant, but the voltage $U_{mess}$ drops to essentially 0 V.

In the period between the points in time $t_2$ and $t_3$ no electrical contacts 13, 14, 15 occur. $U_{mess}$ corresponds to a target value.

In the period between the points in time $t_3$ and $t_4$, two electrical contacts 13 occur between the gas nozzle 9 and the workpiece 3. It can be seen that the welding voltage $U_{SQ}$ remains constant, but the voltage $U_{mess}$ increases because the at least one second resistor 21 is short-circuited.

In the period between the points in time $t_4$ and $t_5$ no electrical contacts 13, 14, 15 occur. $U_{mess}$ corresponds to a target value.

In the period between the points in time $t_5$ and $t_6$, two electrical contacts 15 occur between the contact tube 16 and the workpiece 3. It can be seen that both the welding voltage $U_{SQ}$ and the voltage $U_{mess}$ drop to essentially 0 V. The contact 15 does not constitute a fault during the welding process.

FIG. 5A shows time courses of a welding voltage $U_{SQ}$ and currents $I_{mess-37}$, $I_{mess-38}$ through the first capacitor 37 and the second capacitor 38 (see FIG. 2B) during a welding process. The currents are alternating currents or ripple currents, which are produced by the clocked power section of the welding current source 18. At time point $t_1$ a contact 13 occurs, so that the second resistor 21 and the second capacitor 38 are short-circuited. Consequently, no current or only a small current can be detected through the second capacitor 38. By contrast, the current through the first capacitor 37 increases. The increase or decrease in the currents through the capacitors 37, 38 allows the contact 13 to be identified when compared with a target value. A detection signal S is output at the time of occurrence.

FIG. 5B also shows time courses of a welding voltage $U_{SQ}$ and currents $I_{mess-37}$, $I_{mess-38}$ through the first 37 and the second capacitor 38 during a welding process. However, at time point $t_1$ a contact 14 occurs, so that the first resistor 19 and the first capacitor 37 are short-circuited. Consequently, no current or only a small current can be detected through the first capacitor 37. By contrast, the current through the second capacitor 38 increases. The increase or decrease in the currents through the capacitors 37, 38 allows the contact 14 to be identified when compared with a target value. A detection signal S is output at the time of occurrence.

FIG. 6 schematically shows an exemplary implementation of the welding device 1 in a block diagram. Only the most important components are represented. In this case, on the one hand, the welding voltage $U_{SQ}$ of the welding current source 18 is measured with a further voltage measuring device 28 and, on the other hand, the voltage $U_{mess}$ is measured at one of the resistors 19, 21 (not shown). The resistors 19, 21 are implemented together with a voltage measuring device 26 in a circuit 29.

The welding voltage $U_{SQ}$ of the welding current source 18 does not have to be constant, but can vary during a welding process. In particular in the individual phases of the welding process, for example in an arc phase, in a basic current phase and in a pulse phase, the welding voltage $U_{SQ}$ may be different. Consequently, the target value for the measurement voltage $U_{mess}$ would also vary in the individual phases of the welding process, which would make the evaluation and detection of electrical contacts 13, 14 more difficult. In order to counteract this, a scaling factor P, which results from the wiring, in particular from the voltage divider 22 and the measuring circuit used, can be determined. On the basis of the scaling factor P and a current welding voltage $U_{SQ}$, the target value for the measuring voltage $U_{mess}$ can be determined at any time, so that the electrical contacts 13, 14 can be determined independently of the level of the applied welding voltage $U_{SQ}$. The target value corresponds to the voltage which should be present if there is no contact 13, 14. Of course, in the case of the method used, a current measurement can also be carried out instead of a voltage measurement.

In FIG. 7A and FIG. 7B the course of the welding voltage $U_{SQ}$ and the course of the measurement voltage $U_{mess}$ via the first resistor 19 are represented. In FIG. 7A, a contact 13 occurs at time point $t_1$. In FIG. 7B, a contact 14 occurs at time point $t_1$. The dashed line represents the course of the target value $U_{mess-soll}$ determined by means of the scaling factor P for the measuring voltage $U_{mess}$. Before a contact 13, 14 occurs, the measured voltage $U_{mess}$ corresponds essentially to the target value $U_{mess-soll}$. After a contact 13, 14 occurs at time point $t_1$ the measuring voltage $U_{mess}$ deviates from the course of the target value $U_{mess-soll}$. Based on the type of deviation $U_{diff}$ the measuring voltage $U_{mess}$ from the target value $U_{mess-soll}$ the type of contact 13, 14 can be determined. A detection signal S is output at the time of occurrence. The evaluation preferably takes place in the arc phase of a welding process. It can be seen that the course of the target value $U_{mess-soll}$ is qualitatively equivalent to the course of the welding voltage $U_{SQ}$. This is due to the fact that $U_{mess-soll}$ is continuously determined from the welding voltage $U_{SQ}$ with the aid of the scaling factor P. Due to the scaling, a detection of contacts 13, 14 is independent of the level of the welding voltage $U_{SQ}$ is possible.

The invention claimed is:

1. A method in which a welding process is carried out on a workpiece with a welding torch,
wherein a welding current source provides a welding voltage, and an electrical voltage is applied, at least temporarily, during the welding process to an external element of the welding torch,
wherein a first occurring electrical contact between the external element and a first further element is detected by means of the electrical voltage applied and a second occurring electrical contact between the external element and a second further element is detected by means of the electrical voltage applied,
wherein the welding current source is electrically connected via at least one first resistor to the external element of the welding torch and the external element of the welding torch is connected to the electrical potential of the workpiece via at least one second resistor,
wherein the first occurring electrical contact of the external element with the first further element is detected on the basis of a change of a measured voltage, which drops across the at least one first and/or the at least one second resistor, and/or of a measured current which flows through the at least one first and/or at least one second resistor, and
wherein the second occurring electrical contact of the external element with the second further element is detected on the basis of a change of a measured voltage, which drops across the at least one first and/or the at least one second resistor, and/or of a measured current which flows through the at least one first and/or at least one second resistor.

2. The method according to claim 1, wherein, in the case of a detected electrical contact, a warning signal is emitted, the welding process is interrupted, a welding path is corrected and/or the workpiece is repositioned.

3. The method according to claim 2, wherein the electrical contact is a touching of the external element with the workpiece.

4. The method according to claim 1, wherein at least one first capacitor is arranged parallel to the at least one first resistor and at least one second capacitor is arranged parallel to the at least one second resistor.

5. The method according to claim 4, wherein the first an occurring electrical contact of the external element with the first further element is detected on the basis of a change in a measured current which flows through the at least one first and/or the at least one second capacitor.

6. The method according to claim 1, wherein a change in the welding voltage of the welding current source is used in the detection of a possibly occurring electrical contact.

7. The method according to claim 1, wherein welding torch is arranged on a robot.

8. The method according to claim 1, wherein the external element of the welding torch is an outer wall of a gas nozzle.

9. The method according to claim 1, wherein the first further element is the workpiece.

10. The method according to claim 1, wherein the second further element is a contact tube of the welding torch.

11. A welding device configured to carry out a welding process on a workpiece, the welding device comprising:
a welding torch and a welding current source, the welding current source being configured to provide a welding voltage,
wherein the welding device is configured to apply an electrical voltage to an external element of the welding torch, and a detection unit is configured to detect, during the welding process, a first occurring electrical contact between the external element and a first further element, and a second occurring electrical contact between the external element and a second further element,
wherein, for applying the electrical voltage, the welding current source is connected via at least one first resistor to the external element of the welding torch and the external element of the welding torch is connected via at least one second resistor to the potential of the workpiece,
wherein the first occurring electrical contact of the external element with the first further element is detected on the basis of a change of a measured voltage, which drops across the at least one first and/or the at least one second resistor, and/or of a measured current which flows through the at least one first and/or at least one second resistor, and
wherein the second occurring electrical contact of the external element with the second further element is detected on the basis of a change of a measured voltage, which drops across the at least one first and/or the at least one second resistor, and/or of a measured current which flows through the at least one first and/or at least one second resistor.

12. The welding device according to claim 11, wherein at least one first capacitor is arranged parallel to the at least one first resistor and at least one second capacitor is arranged parallel to the at least one second resistor.

13. The welding device according to claim 11, wherein the welding device is an inert gas welding device.

14. A method in which a welding process is carried out on a workpiece with a welding torch,
wherein a welding current source provides a welding voltage, and an electrical voltage is applied, at least temporarily, during the welding process to an outer wall of a gas nozzle of the welding torch,
wherein a first occurring electrical contact between the outer wall of the gas nozzle and the workpiece is detected by means of the electrical voltage applied and a second occurring electrical contact between the outer wall of the gas nozzle and a contact tube of the welding torch is detected by means of the electrical voltage applied,
wherein the welding current source is electrically connected via at least one first resistor to the outer wall of the gas nozzle of the welding torch and the outer wall of the gas nozzle of the welding torch is connected to the electrical potential of the workpiece via at least one second resistor,
wherein the first occurring electrical contact of the outer wall of the gas nozzle with the workpiece is detected on the basis of a change of a measured voltage, which drops across the at least one first and/or the at least one second resistor, and/or of a measured current which flows through the at least one first and/or at least one second resistor, and
wherein the second occurring electrical contact of the outer wall of the gas nozzle with the contact tube is detected on the basis of a change of a measured voltage, which drops across the at least one first and/or the at least one second resistor, and/or of a measured current which flows through the at least one first and/or at least one second resistor.

* * * * *